(12) United States Patent
Nagano et al.

(10) Patent No.: US 12,467,889 B2
(45) Date of Patent: Nov. 11, 2025

(54) NON-DESTRUCTIVE INSPECTION DEVICE AND NON- DESTRUCTIVE INSPECTION SYSTEM

(71) Applicants: TOPCON CORPORATION, Tokyo (JP); RIKEN, Wako (JP)

(72) Inventors: Shigenori Nagano, Tokyo (JP); Satoshi Yanobe, Tokyo (JP); Akira Yajima, Tokyo (JP); Hanako Aikoh, Tokyo (JP); Satoru Ishiguro, Tokyo (JP); Yoshie Otake, Wako (JP); Yasuo Wakabayashi, Wako (JP); Masato Takamura, Wako (JP)

(73) Assignees: TOPCON CORPORATION, Tokyo (JP); RIKEN, Wako (JP)

(*) Notice: Subject to any disclaimer, the term of this patent is extended or adjusted under 35 U.S.C. 154(b) by 193 days.

(21) Appl. No.: 18/563,557

(22) PCT Filed: May 24, 2022

(86) PCT No.: PCT/JP2022/021197
§ 371 (c)(1),
(2) Date: Nov. 22, 2023

(87) PCT Pub. No.: WO2022/250038
PCT Pub. Date: Dec. 1, 2022

(65) Prior Publication Data
US 2024/0272102 A1 Aug. 15, 2024

(30) Foreign Application Priority Data
May 24, 2021 (JP) ................. 2021-087199

(51) Int. Cl.
*G01N 23/222* (2006.01)
*G01T 1/02* (2006.01)
*G01T 7/12* (2006.01)

(52) U.S. Cl.
CPC ............. *G01N 23/222* (2013.01); *G01T 1/02* (2013.01); *G01T 7/12* (2013.01);
(Continued)

(58) Field of Classification Search
CPC ......... G01N 23/222; G01N 2223/0745; G01N 2223/1013; G01N 2223/106;
(Continued)

(56) References Cited

U.S. PATENT DOCUMENTS 2,967,938 A * 1/1961 Alexander ........... G01N 23/222
250/382
4,266,132 A * 5/1981 Marshall, III ....... G01N 23/222
250/390.1
(Continued)

FOREIGN PATENT DOCUMENTS

CN 201664703 U 12/2010
JP 2001-194324 A 7/2001
(Continued)

OTHER PUBLICATIONS

Wakabayashi et al., "Nondestructive measurement technique for salt distribution in concrete by neutron-captured prompt gamma-ray analysis," NPGA, Inspection Engineering, Feb. 2019, pp. 1811-1817.
(Continued)

*Primary Examiner* — Kiho Kim
(74) *Attorney, Agent, or Firm* — Chiesa Shahinian & Giantomasi PC

(57) ABSTRACT

A non-destructive inspection system includes a non-destructive inspection apparatus and a management apparatus. The non-destructive inspection apparatus includes: a neutron emission unit capable of emitting a neutron beam; a gamma-ray detector capable of detecting a gamma ray; an apparatus case covering the neutron emission unit and the gamma-ray
(Continued)

detector and including an opening; an outer shutter configured to open and close the opening; dose monitors each provided on the apparatus case and configured to detect a radioactive dose; an apparatus communication unit capable of transmitting apparatus information including the detected radioactive dose to the management apparatus and capable of receiving inspection permission information from the management apparatus; and an apparatus control unit configured to open the outer shutter and allows emission of the neutron beam from the neutron emission unit upon acquisition of the inspection permission information.

8 Claims, 5 Drawing Sheets

(52) U.S. Cl.
CPC ............... *G01N 2223/0745* (2013.01); *G01N 2223/1013* (2013.01); *G01N 2223/106* (2013.01); *G01N 2223/204* (2013.01); *G01N 2223/631* (2013.01)

(58) Field of Classification Search
CPC ....... G01N 2223/204; G01N 2223/631; G01N 23/22; G01T 1/02; G01T 7/12; G01T 7/00; G16Y 10/30; G16Y 20/10; G16Y 20/40; G16Y 40/30; Y02E 30/30
See application file for complete search history.

(56) References Cited

U.S. PATENT DOCUMENTS

| | | |
|---|---|---|
| 8,680,477 B2 | 3/2014 | Nose et al. |
| 2012/0199754 A1 | 8/2012 | Nose et al. |
| 2016/0154138 A1 | 6/2016 | Suvakovic et al. |
| 2021/0033542 A1 | 2/2021 | Wakabayashi et al. |

FOREIGN PATENT DOCUMENTS

| | | |
|---|---|---|
| JP | 2010-217020 A | 9/2010 |
| JP | 2011-085481 A | 4/2011 |
| JP | 2015-203648 A | 11/2015 |
| JP | 2016-525687 A | 8/2016 |
| KR | 10-2009-0061842 A | 6/2009 |
| WO | 2019/198260 A1 | 10/2019 |

OTHER PUBLICATIONS

International Search Report and Written Opinion mailed Jul. 12, 2022, in connection with International Patent Application No. PCT/JP2022/021197, 9 pgs (including translation).

* cited by examiner

NON-DESTRUCTIVE INSPECTION DEVICE AND NON-DESTRUCTIVE INSPECTION SYSTEM

This application is a National Stage under 35 U.S.C. 371 of International Patent Application No. PCT/JP2022/021197, filed May 24, 2022, which claims priority to the Japanese Patent Application No. 2021-087199, filed May 24, 2021; the disclosures of all of which are incorporated herein by reference in their entireties.

BACKGROUND

The present disclosure relates to a non-destructive inspection apparatus and a non-destructive inspection system for inspecting an inspection object using a neutron beam.

BACKGROUND ART

In recent years, it has been desired to appropriately maintain, repair, or renew aging infrastructure (hereinafter, referred to as infrastructure constructions) such as roads, bridges, tunnels, and building structures.

To inspect such an infrastructure construction, non-destructive inspection is performed using radiation, such as X-rays, penetrating an object. This non-destructive inspection allows an internal structure of an inspection object to be analyzed without destroying the inspection object.

In particular, in recent years, non-destructive inspection apparatuses using neutron beams with higher penetrating power than X-rays have also been studied. For example, Patent Document 1 and Non-Patent Document 1 each disclose a non-destructive inspection method that enables acquisition of a salt concentration distribution inside concrete by utilizing neutron beams and gamma ($\gamma$)-rays generated in reaction with the neutron beams.

CITATION LIST

Patent Document

PATENT DOCUMENT 1: Japanese Unexamined Patent Publication No. 2011-85481

Non-Patent Document

Non-Patent Document 1: Yasuo Wakabayashi, Yuichi Yoshimura, Maki Mizuta, Yujiro Ikeda, Yoshie Otake/Riken, Non-Destructive Measurement Technique for Salt Distribution in Concrete by Neutron-Captured Prompt Gamma-Ray Analysis, Inspection Engineering February 2019, JAPAN INDUSTRIAL PUBLISHING (NPGA)

SUMMARY OF THE INVENTION

Technical Problems

In the technique using neutron beams as in Patent Document 1 and Non-Patent Document 1, there is a need to take safety measures, such as reduction in radioactive exposure of an operator at a site and people around him/her, management of the exposure dose, and reduction in the misuse or abuse of devices with radiation sources by another person.

The present disclosure was made to solve such problems. It is an objective of the present disclosure to provide a non-destructive inspection apparatus and a non-destructive inspection system that allow for safe non-destructive inspection for an inspection object, using neutron beams.

Solution to the Problems

In order to achieve the above objective, a non-destructive inspection apparatus according to the present disclosure is a non-destructive inspection apparatus that irradiates an inspection object with a neutron beam to analyze an internal structure of the inspection object based on a radioactive ray generated in reaction with the neutron beam, the non-destructive inspection apparatus including: a neutron emission unit capable of emitting the neutron beam along a predetermined emission line; a radioactive-ray detector capable of detecting the radioactive ray incident in a predetermined detection line intersecting the emission line; an apparatus case covering the neutron emission unit and the radioactive-ray detector, the apparatus case including an opening on paths of the emission line and the detection line; a shutter configured to open and close the opening of the apparatus case; a dose detector provided on the apparatus case and configured to detect a radioactive dose; an apparatus communication unit capable of transmitting apparatus information including the radioactive dose detected by the dose detector to an outside and capable of receiving inspection permission information from the outside; and an apparatus control unit configured to open the shutter to allow emission of the neutron beam from the neutron emission unit upon acquisition of the inspection permission information from the outside via the apparatus communication unit.

The non-destructive inspection apparatus may further include: a position information acquisition unit provided on the apparatus case and capable of acquiring position information. The apparatus information may include the position information.

In order to achieve the above objective, a non-destructive inspection system according to the present disclosure includes: the non-destructive inspection apparatus described above; a management communication unit capable of receiving the apparatus information from the apparatus communication unit and capable of transmitting the inspection permission information to the apparatus communication unit; and a management control unit configured to transmit the inspection permission information to the apparatus communication unit via the management communication unit if a predetermined inspection execution requirement according to the apparatus information is satisfied.

In the non-destructive inspection system, the inspection execution requirement may include an inspection position requirement for determining whether the non-destructive inspection apparatus is located at an inspection target point or within an inspection target range, based on the position information included in the apparatus information.

In the non-destructive inspection system, the inspection execution requirement may include an apparatus use requirement for determining whether the radioactive dose attributed to the non-destructive inspection apparatus falls within a predetermined range, based on the radioactive dose included in the apparatus information.

In the non-destructive inspection system, the management communication unit may be capable of acquiring operator information on an operator who conducts work using the non-destructive inspection apparatus, and the inspection execution requirement may include an operator requirement for determining whether the operator is a person who is allowed to conduct work using the non-destructive inspection apparatus, based on the operator information.

In the non-destructive inspection system, the management control unit may be capable of generating route information to the inspection target point or the inspection target range, based on the position information included in the apparatus information and map information.

In the non-destructive inspection system, the management control unit may acquire power supply information on a power supply of the non-destructive inspection apparatus and generates power-off information for causing the non-destructive inspection apparatus to close the shutter and turn off the power supply if a remaining power level of the non-destructive inspection apparatus is lower than or equal to a predetermined remaining power level.

Advantages of the Invention

The present disclosure using the means described above allows for non-destructive inspection for an inspection object, using neutron beams, while ensuring the safety of the surroundings.

DETAILED DESCRIPTION

Embodiments of the present disclosure will be described below with reference to the drawings.

First Embodiment

A first embodiment of the present disclosure will be described below.

Figure 1:
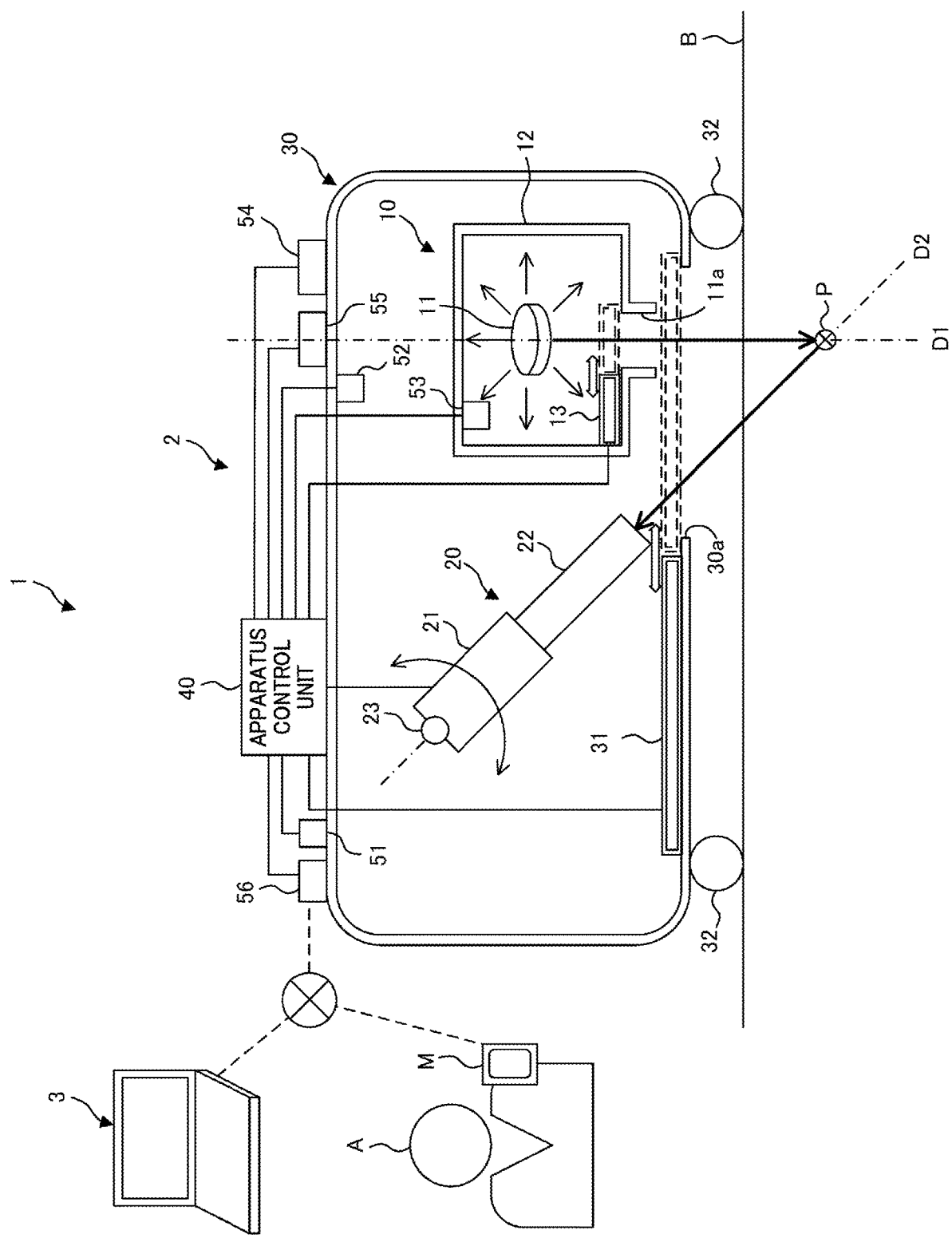
FIG. 1 is a schematic configuration diagram illustrating a non-destructive inspection system including a non-destructive inspection apparatus according to a first embodiment of the present disclosure.
Figure 2:
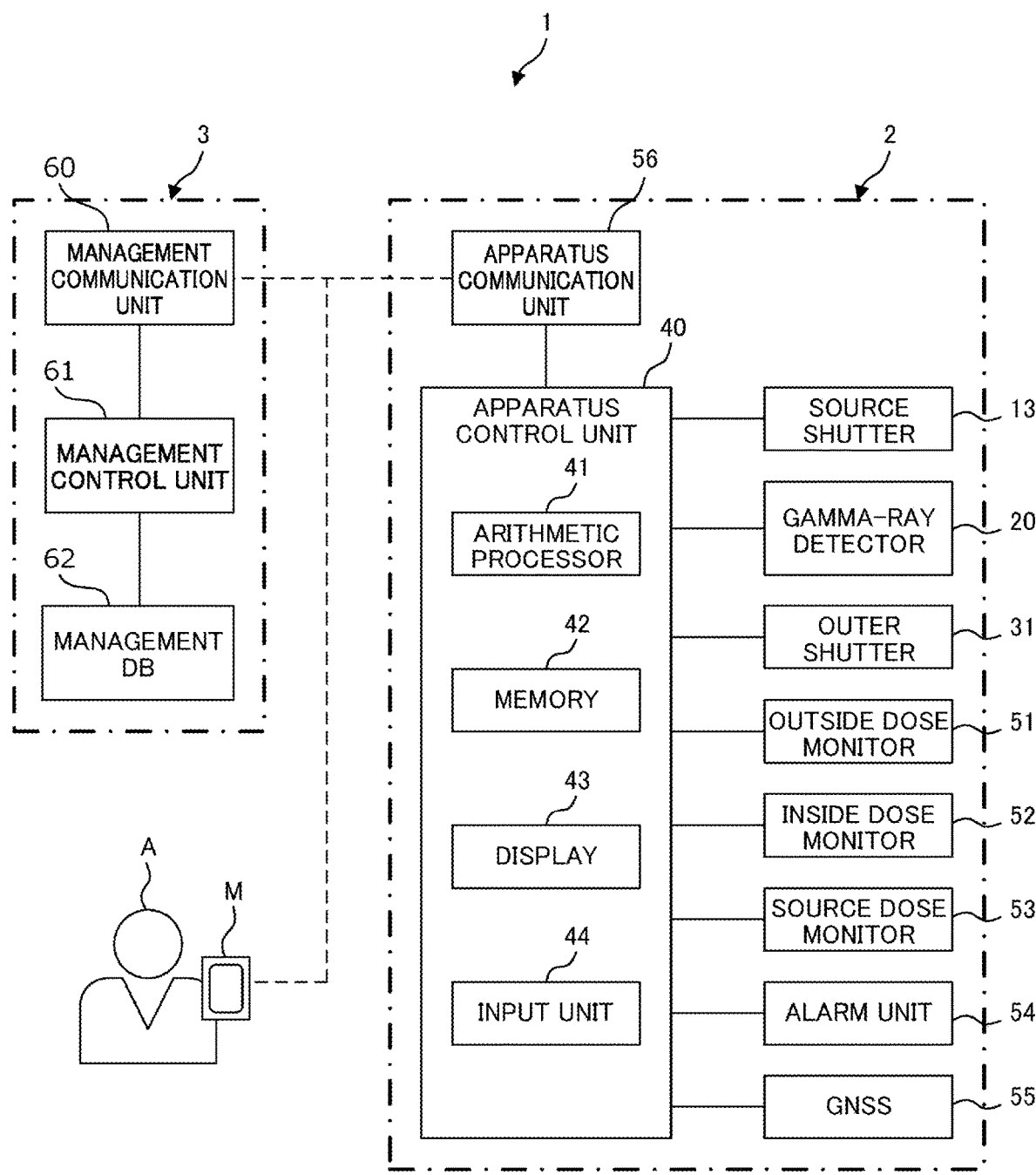
FIG. 2 is a block diagram illustrating a control system of the non-destructive inspection system including the non-destructive inspection apparatus of the first embodiment of the present disclosure.

FIG. 1 is a schematic configuration diagram of a non-destructive inspection system 1 including a non-destructive inspection apparatus 2 according to a first embodiment of the present disclosure. FIG. 2 is a block diagram illustrating a control system of the non-destructive inspection system 1 including the non-destructive inspection apparatus 2. A configuration of the non-destructive inspection system 1 including the non-destructive inspection apparatus 2 of this embodiment will now be described with reference to these figures.

As shown in FIG. 1, the non-destructive inspection system 1 of this embodiment mainly includes: the non-destructive inspection apparatus 2 that irradiates an inspection object with a neutron beam to analyze an internal structure of the inspection object based on a radioactive ray generated in reaction with the neutron beam; a management apparatus 3 that remotely manages the non-destructive inspection apparatus 2 from the outside; and an operator A who directly operates the non-destructive inspection apparatus 2. For the sake of simplicity, the description assumes one operator, which may be two or more operators. The operator A keeps a mobile terminal M, such as a smartphone or a tablet.

The non-destructive inspection apparatus 2 of this embodiment includes a neutron emission unit 10 and a gamma-ray detector (i.e., the radioactive-ray detector) 20 in an apparatus case 30. The non-destructive inspection apparatus 2 includes an apparatus control unit 40, to which the following components are connected: dose monitors 51 to 53 that detect radioactive doses in respective locations, an alarm unit 54 that issues an alarm, a global navigation satellite system (GSNN) 55 (the position information acquisition unit) that acquires position information, and an apparatus communication unit 56. The dose monitors are namely, an outside dose monitor 51 (i.e., the first dose detector), an inside dose monitor 52 (i.e., the second dose detector), and a source dose monitor 53 (i.e., the third dose detector). Although not shown, the non-destructive inspection apparatus 2 includes a power supply, such as a battery. In this embodiment, the non-destructive inspection apparatus 2 is placed on a bridge B made of concrete, which is an inspection object.

The neutron emission unit 10 includes a neutron source 11 in a source case (i.e., the second case) 12. The neutron source 11 of this embodiment is a radioisotope that spontaneously and radially generates neutron beams, and is a $^{252}$Cf source, for example.

The source case 12 is in a hollow, substantially cubic shape, and includes, in the bottom surface thereof, an emission hole 12a for neutron beams in this embodiment. The source case 12 is also provided with a source shutter 13 that opens and closes the emission hole 12a. The source case 12 and the source shutter 13 are made of a material, such as lead or iron, capable of shielding neutron beams. The emission hole 12a is a circular hole, for example. The source shutter 13 is an opening and closing plate member that slides on the bottom surface of the source case 12 so as to open and close the emission hole 12a using an actuator (not shown).

The neutron emission unit 10 with such a configuration is capable of emitting, to the outside, only the neutron beams directed downward toward the emission hole 12a among the neutron beams radially emitted from the neutron source 11. That is, in this embodiment, the neutron beams are emitted downward along an "emission line D1". The emission and stop (non-emission) of the neutron beams can be controlled by opening and closing the source shutter 13. The gamma-ray detector 20 includes a detector 21 capable of detecting gamma (γ-) rays, a collimator 22, and a movable shaft 23.

The detector 21 is a germanium semiconductor detector (i.e., a Ge detector), for example. The collimator 22 is connected to the top of the detector 21 capable of detecting the dose of the gamma rays incident via the collimator 22.

The collimator 22 is a cylindrical body made of a material, such as lead or iron, which blocks gamma rays and has the function of narrowing the gamma rays incident from outside into the gamma ray in one direction toward the detector 21. That is, in this embodiment, the axis of the collimator 22 extends along a detection line D2 of the gamma ray. As shown in FIG. 1, the detection line D2 intersects the emission line D1 at one point. This intersection serves as the inspection point P inside the bridge B as the inspection object. With a higher salt concentration at this inspection point P, a higher gamma dose than usual is detected by the detector 21.

The movable shaft 23 extends horizontally at the rear end of the detector 21. The detector 21 is capable of swinging vertically about the movable shaft 23, together with the collimator 22. This swing of the detector 21 about the movable shaft 23 makes the inspection point P movable on the emission line D1.

The apparatus case 30 covers the neutron emission unit 10 and the gamma-ray detector 20, and includes an opening (i.e., the first opening) 30a on the paths of the emission line D1 and the detection line D2.

Specifically, the apparatus case 30 is in a hollow, substantially rectangular parallelepiped shape, and made of a material, such as lead or iron, capable of shielding neutron beams. The apparatus case 30 contains the neutron emission unit 10 on one horizontal side, and the gamma-ray detector 20 on the other horizontal side.

The apparatus case 30 includes, in the bottom surface thereof, the opening 30a on the paths of the emission line D1 and the detection line D2. The shape of the opening 30a is not particularly limited as long as the opening covers the emission line D1 and the detection line D2. For example, the opening is a rectangular hole in this embodiment. Note that the opening range of the opening 30a is designed to include the range of changing the detection line D2 by the swing of the gamma-ray detector 20 about the movable shaft 23.

The apparatus case 30 includes, on the bottom surface thereof, an outer shutter (i.e., the first shutter) 31 that opens and closes the opening 30a. The outer shutter 31 is made of a material, such as lead or iron, capable of shielding neutron beams. The outer shutter 31 is a plate member that slides on the bottom surface of the apparatus case 30 so as to open and close the opening 30a using an actuator (not shown).

The apparatus case 30 includes wheels 32 outside the bottom surface thereof and is freely movable on the bridge B. In this embodiment, the apparatus case 30 directly includes the wheels 32. Alternatively, the apparatus case 30 without any wheels may be placed on a cart or a moving object so as to be movable.

In this embodiment, the apparatus case 30 is, outside the top surface thereof, provided with the outside dose monitor 51 which detects the radioactive dose around the outside of the non-destructive inspection apparatus 2. In addition, the apparatus case 30 is, inside the top surface thereof, provided with the inside dose monitor 52 which detects the radioactive dose inside the non-destructive inspection apparatus 2. The source case 12 includes, inside the top surface thereof, the source dose monitor 53 which detects the radioactive dose inside the source case 12.

Examples of the radioactive rays detectable by the dose monitors 51, 52, and 53 include alpha ($\alpha$-) rays, beta ($\beta$-) rays, and gamma ($\gamma$-) rays. In addition, the dose monitors 51, 52, and 53 are each capable of detecting a spatial dose rate (e.g., microsievert per hour (uSv/h)) as the radioactive dose. Note that the type of detectable radioactive rays and the radioactive dose are not limited thereto, as long as the exposure dose to a human body is detectable.

The alarm unit 54 is provided outside the top surface of the apparatus case 30, and has the function of issuing an alarm to the surroundings of the non-destructive inspection apparatus 2. Examples of the alarm by the alarm unit 54 include emitting an alarm sound, emitting a sound indicating a danger, or lighting or blinking an alarm lamp. The alarm unit 44 not only issues an alarm but may also instruct the operator and other people to take an action after the alarm or display the reason for the alarm. Examples of the action after the alarm include evacuation and an evacuation advisory to the surroundings.

The GNSS 55 is a global positioning system (GPS), for example, and is located on the axis of the emission line D1 of the neutrons N, that is, vertically above the inspection point P in this embodiment. The GNSS 45 can receive information from satellites and generate its own position coordinates and the relative position information about the inspection point P.

The apparatus communication unit 56 is a communication instrument capable of communicating with various information terminals outside the non-destructive inspection apparatus 2. For example, the apparatus communication unit 56 can communicate with an information terminal via a network (communication network) such as the Internet, or via wireless or wired communication.

As shown in FIG. 2, the apparatus control unit 40 is a dedicated computer or a general-purpose computer in which software is installed, for example. Specifically, the apparatus control unit 40 includes, for example: an arithmetic processor 41 for various arithmetic processing; a memory 42 capable of storing information, such as the gamma dose detected by the gamma-ray detector 20 or the radioactive doses detected by the dose monitors 51, 52, and 53, the position information acquired by the GNSS 55, or other information; a display 43 capable of displaying, for example, a result of the arithmetic processing; and an input unit 44 that receives operations from the outside, such as those by the operator A.

The apparatus control unit 40 is electrically connected to the source shutter 13, the gamma-ray detector 20, the outer shutter 31, the dose monitors 51, 52, and 53, the alarm unit 54, the GNSS 55, and the apparatus communication unit 56. The apparatus control unit 40 can execute at least control related to inspection (hereinafter referred to as "inspection control").

In the inspection control, the apparatus control unit 40 mainly controls the source shutter 13, the outer shutter 31, and the gamma-ray detector 20. Specifically, the apparatus control unit 40 opens the outer shutter 31 and the source shutter 13 at the time of inspection on condition that the inspection permission information is acquired. On the other hand, upon acquisition of the inspection prohibition information, the apparatus control unit 40 closes the source shutter 13 and the outer shutter 31 and causes the alarm unit 54 to issue an alarm. As described above, at this time, the alarm unit 54 not only issues the alarm but may also instruct people to take an action after the alarm or display the reason for the alarm.

In particular, at the time of inspection, the apparatus control unit 40 opens the outer shutter 31 prior to the source shutter 13. More specifically, the apparatus control unit 40 opens the outer shutter 31 to allow the gamma-ray detector 20 to detect the gamma dose as of before the emission of the neutron beams, and then opens the source shutter 13 to allow for emission of neutron beams for inspection.

The inspection of this embodiment is as follows. The gamma-ray detector 20 detects the gamma rays generated in reaction with the neutron beam emitted from the neutron emission unit 10 to the inspection object. The amount of chlorine (i.e., the salt concentration) at the inspection point P is analyzed based on the gamma dose detected. Any typically known method may be employed to analyze the salt concentration in a specific inspection object. For example, collimation or gamma-ray intensity comparison described in Non-Patent Document 1 is employed.

The apparatus control unit 40 is communicatively connected to the management apparatus 3 via the apparatus communication unit 56. The apparatus control unit 40 can transmit apparatus information, which is information related to the non-destructive inspection apparatus 2, to the management apparatus 3 via the apparatus communication unit 56. The apparatus information includes, for example, the apparatus ID of the non-destructive inspection apparatus 2, the radioactive doses detected by the dose monitors 51, 52, and 53, the position information acquired by the GNSS 55, and power supply information including the remaining power level of the power supply included in the non-destructive inspection apparatus 2. The apparatus control unit 40 can also transmit inspection result information to the management apparatus 3 via the apparatus communication unit 56. The inspection result information includes, for example, the salt concentration acquired as a result of the inspection, the apparatus ID of the non-destructive inspection apparatus 2 used, the operator ID of the operator A, the inspection date and time, and the emission time of the neutron beam.

The management apparatus 3 is a dedicated computer or a general-purpose computer in which software is installed, for example, and includes a management communication unit 60, a management control unit 61, and a management database 62 (hereinafter referred to as a "management DB 62").

Similarly to the apparatus communication unit 56, the management communication unit 60 is a communication instrument capable of communicating with various information terminals via a network (communication network) such as the Internet, or via wireless or wired communication, for example.

Although not shown, the management control unit 61 includes an arithmetic processor for various arithmetic processing, a display capable of displaying, for example, a result of the arithmetic processing, an input unit that receives operations from the outside, such as those by an administrator. The management control unit 61 has the function of communicating with the apparatus control unit 40, a mobile terminal M held by the operator A, or any other suitable devices via the management communication unit 60 to control the non-destructive inspection apparatus 2 based on the acquired information.

Specifically, the management control unit 61 determines whether inspection execution requirements are met, that is, whether inspection by the non-destructive inspection apparatus 2 is executable. The inspection execution requirements include a plurality of requirements, such as an inspection position requirement according to the position information on the non-destructive inspection apparatus 2, an apparatus use requirement according to the radioactive doses detected by the dose monitors 51, 52, and 53, and an operator requirement according to the operator information.

The inspection position requirement is for determining whether the non-destructive inspection apparatus 2 is located at a correct position. Specifically, in determining whether the inspection position requirement is met, it is determined whether the position information acquired by the GSNN 55 of the non-destructive inspection apparatus 2 is at the inspection target point or within the inspection target range. If the position information on the non-destructive inspection apparatus 2 is at the inspection target point or within the inspection target range, it is determined that the inspection position requirement is met, whereas if the position information is not at the inspection target point or not within the inspection target range, it is determined that the inspection position requirement is not met.

The apparatus use requirement is for determining whether the radioactive dose attributed to the non-destructive inspection apparatus 2 falls within a predetermined safety range. Specifically, in determining whether the apparatus use requirement is met, it is determined whether each of the radioactive doses detected by the dose monitors 51, 52, and 53 of the non-destructive inspection apparatus 2 is lower than or equal to a predetermined threshold. If each of the radioactive doses falls within the predetermined threshold, it is determined that the apparatus use requirement is met, whereas if any of the radioactive doses exceeds the predetermined threshold, it is determined that the apparatus use requirement is not met.

This predetermined threshold is set for each of the dose monitors 51, 52, and 53. In this embodiment, a first threshold T1 is set for the outside dose monitor 51. A second threshold T2 is set for the inside dose monitor 52. A third threshold T3 is set for the source dose monitor 53. In particular, the first threshold T1 is set to a value associated with the exposure dose to the human body. A dose monitor closer to the neutron source 11 usually has a higher radioactive dose. A higher value is thus set as the threshold for a dose monitor closer to the neutron source 11. That is, the first, second, and third thresholds T1, T2, and T3 are set in the ascending order ($T1<T2<T3$).

The operator requirement is for determining whether the operator A is a person who is allowed to relate to the inspection. Specifically, in determining whether the operator requirement is met, the operator information, which will be described later, is acquired to make a determination on various conditions. The conditions include, for example, whether the operator ID of the operator A is registered in advance, whether the operator A is a registered operator who is allowed to use the non-destructive inspection apparatus 2, whether or not the cumulative exposure dose of the operator A exceeds a predetermined threshold, and whether a predetermined number of days have passed since the last inspection date. If all these conditions are satisfied, it is determined that the operator requirement is met, whereas if any of the conditions is not satisfied, it is determined that the operator requirement is not met.

The management control unit 61 makes a determination on the inspection execution requirements described above. For example, if all the inspection execution requirements are met, the management control unit 61 generates inspection permission information as a result of the determination on the inspection execution requirements. The inspection permission information indicates that the inspection by the non-destructive inspection apparatus 2 is permissible. On the other hand, if any of the inspection execution requirements is not met, the management control unit 61 generates inspection prohibition information as a result of the determination on the inspection execution requirements. The inspection prohibition information indicates that the inspection by the non-destructive inspection apparatus 2 is impermissible. The inspection prohibition information includes at least a command to close the source shutter 13 and the outer shutter 31. The management control unit 61 generates the inspection prohibition information so that the inspection prohibition information also includes, for example, a reason for the prohibition of inspection that indicates which of the inspection execution requirements is not met.

In addition to the determination on the inspection execution requirements, the management control of the non-destructive inspection apparatus 2 by the management control unit 61 can also execute guide control to guide the non-destructive inspection apparatus 2 to the inspection point, power supply management control for the non-destructive inspection apparatus 2, and other control.

In the guide control, the management control unit 61 generates route information to the inspection target point or the inspection target range, based on the position information acquired by the GSNN 55 of the non-destructive inspection apparatus 2 and map information stored in the management DB 62, which will be described later. The management control unit 61 then transmits the route information to the non-destructive inspection apparatus 2 or the mobile terminal M of the operator A. Accordingly, the operator A can move the non-destructive inspection apparatus 2 to the inspection target point or the inspection target range, based on the route information displayed on the display 43 of the non-destructive inspection apparatus 2 or the mobile terminal M. The management control unit 61 determines the route by preferentially selecting an area with few houses or people in view of the exposure to the surroundings, for example.

In the power supply management control, the management control unit 61 generates power-off information and transmits the power-off information to the non-destructive inspection apparatus 2 if it is determined that the remaining power level of the non-destructive inspection apparatus 2 is lower than or equal to a predetermined remaining power level based on the power supply information included in the apparatus information on the non-destructive inspection apparatus 2. The power-off information is for turning off the power supply of the non-destructive inspection apparatus 2 after closing the source shutter 13 and the outer shutter 31 of the non-destructive inspection apparatus 2.

The management DB 62 stores various information, such as information on the non-destructive inspection apparatus 2, information on the operator A, and the map information. The information stored in the management DB 62 is not only the information on the single non-destructive inspection apparatus 2 nor the single operator A shown in FIGS. 1 and 2, but also the information on another non-destructive inspection apparatus and operator.

The information stored as the information on the non-destructive inspection apparatus includes, for example, the apparatus ID for identifying an apparatus, the specifications of each non-destructive inspection apparatus, the place, date, and time of inspection (inspection date and time), an emission time of a neutron beam in each inspection, a cumulative emission time up to now, and a result of inspection.

The information stored as the information on the operator includes, for example, personal information, such as the name, age, address, and contact address of each operator, the operator ID given to the operator, the inspection date and time when the operator has participated, the exposure dose of the operator in each inspection, and a cumulative exposure dose. These pieces of information are used when the management control unit 61 determines whether the inspection execution requirements are met.

The map information at least includes information on the geography and the latitude and longitude of the area including the inspection point, and information such as a travel route to the inspection point. The map information reflects information on the place and the date and time of the non-destructive inspection, based on the information on the non-destructive inspection apparatus described above. The map information also includes information such as the exposure dose at each point.

The management apparatus 3 with such a configuration can remotely control the non-destructive inspection apparatus 2.

Figure 3:
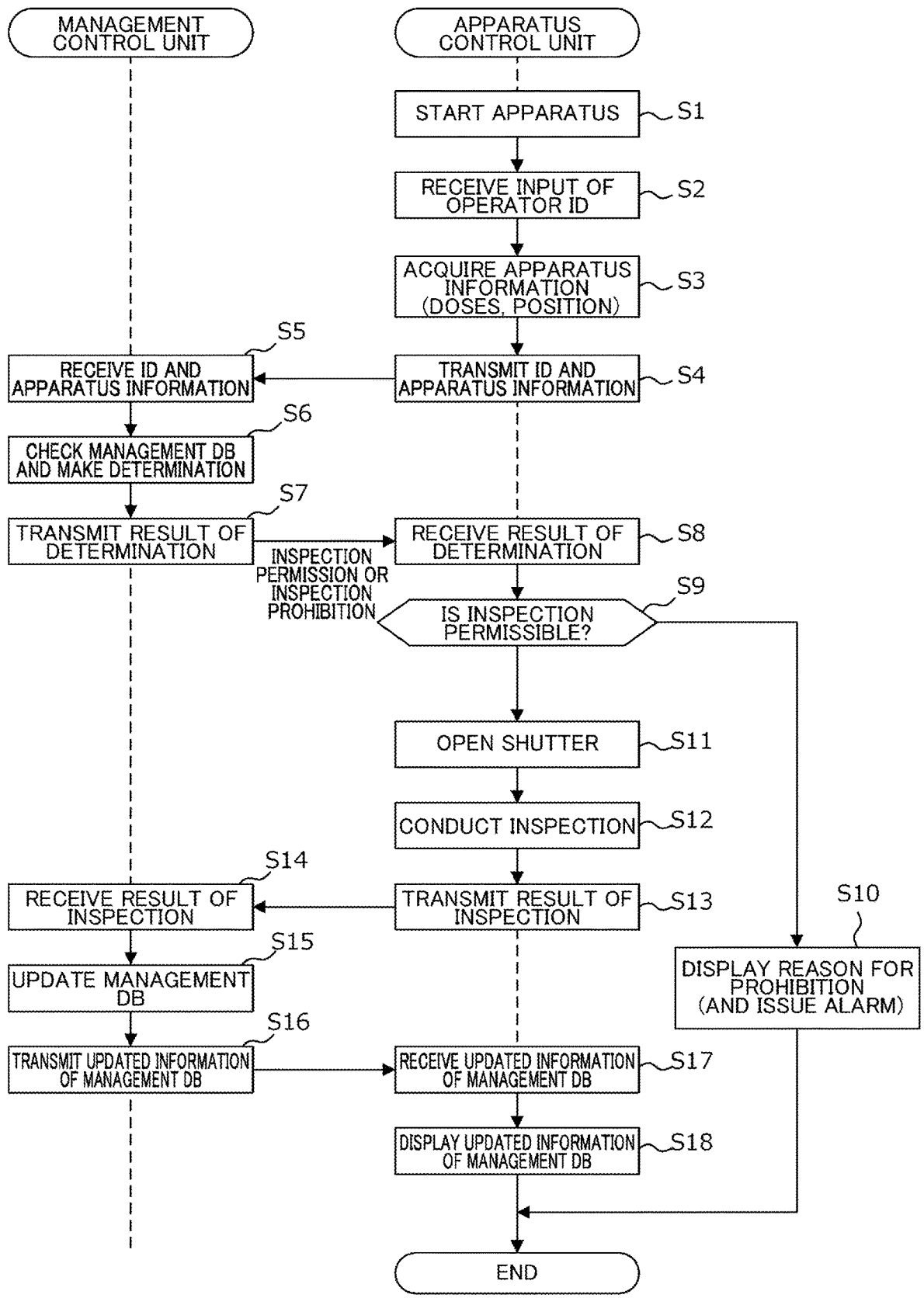
FIG. 3 is a flowchart showing an inspection procedure in the non-destructive inspection system including the non-destructive inspection apparatus of the first embodiment of the present disclosure.

FIG. 3 is a flowchart illustrating an inspection procedure of the non-destructive inspection system 1. The inspection procedure will be described with reference to the flowchart.

As a precondition, an operator A, for example, places the non-destructive inspection apparatus 2 on the inspection point P. The inspection point P may be stored in advance in the memory 42 of the apparatus control unit 40. Alternatively, the apparatus control unit 40 may acquire information stored in the management DB 62 from the management apparatus 3. The position information on the non-destructive inspection apparatus 2 is available from the GSNN 54. The display 43 of the apparatus control unit 40 may guide the operator A to the intended inspection point P. After placing the non-destructive inspection apparatus 2 at the inspection point P, the following routine starts.

In step S1, the operator A, for example, starts the non-destructive inspection apparatus 2. This is achieved by turning on the power supply through an operation of the input unit 44 of the apparatus control unit 40, for example.

In step S2, the apparatus control unit 40 receives an input of the operator ID by the operator A. The operator ID may be acquired through the input of the operator ID by the operator A via the input unit 44 of the apparatus control unit 40, through the use of the mobile terminal M kept by the operator A, or through holding a contactless ID card containing the information on the operator ID over a reader of the input unit 44, for example.

In step S3, the apparatus control unit 40 acquires apparatus information including the radioactive doses detected by the dose monitors 51, 52, and 53 and the position information acquired by the GNSS 55.

In step S4, the apparatus control unit 40 transmits, via the apparatus communication unit 56, the operator ID acquired in step S2 and the apparatus information acquired in step S3 to the management apparatus 3.

In step S5, the management control unit 61 of the management apparatus 3 receives the operator ID and the apparatus information transmitted from the non-destructive inspection apparatus 2 via the management communication unit 60.

In step S6, the management control unit 61 checks the information corresponding to the operator ID and the apparatus information acquired in step S5 against the information stored in the management DB 62. The management control unit 61 then determines whether inspection execution requirements are met. Specifically, the management control unit 61 makes a determination as to the inspection position requirement, the apparatus use requirement, and the operator requirement described above. If all the inspection execution requirements are met, the management control unit 61 generates inspection permission information as a result of the determination. If any of the inspection execution requirements is not met, the management control unit 61 generates inspection prohibition information as a result of the determination.

In step S7, the management control unit 61 transmits the result of the determination to the management apparatus 3 via the management communication unit 60.

In step S8, the apparatus control unit 40 of the non-destructive inspection apparatus 2 receives the result of the determination transmitted from the management apparatus 3 via the apparatus communication unit 56.

In step S9, the apparatus control unit 40 determines whether the inspection is permissible, based on the received result of the determination. If the received result of the determination is the inspection prohibition information, the apparatus control unit 40 advances the processing to step S10. On the other hand, in step S9, if the received result of the determination is the inspection permission information, the apparatus control unit 40 advances the processing to step S11.

In step S10, the apparatus control unit 40 causes the display 43 to display the reason for prohibition of inspection included in the inspection prohibition information, and ends the routine. The reason for prohibition of inspection may be displayed on the mobile terminal M kept by the operator A.

On the other hand, in step S11, the apparatus control unit 40 opens the source shutter 13 and the outer shutter 31 to start inspection. Specifically, the apparatus control unit 40 opens the outer shutter 31 first, detects the gamma dose before the emission of a neutron beam, using the gamma-ray detector 20, and then opens the source shutter 13.

In the subsequent step S12, the apparatus control unit 40 conducts inspection. Specifically, since the source shutter 13 is opened in step S11, a neutron beam is emitted from the neutron emission unit 10. The gamma-ray detector 20 detects the gamma rays generated from the inspection object to which the neutron beam has been emitted. The amount of chlorine (i.e., the salt concentration) at the inspection point P is analyzed based on the detected gamma dose. The apparatus control unit 40 generates inspection result information including, for example, the analyzed salt concentration, the apparatus ID of the non-destructive inspection apparatus 2 used this time, the operator ID of the operator A, the inspection date and time, and the emission time of the neutron beam.

In step S13, the apparatus control unit 40 transmits the inspection result information generated in step S12 to the management apparatus 3 via the apparatus communication unit 56. In step S14, the management control unit 61 of the management apparatus 3 receives the inspection result information transmitted from the non-destructive inspection apparatus 2 via the management communication unit 60.

In step S15, the management control unit 61 updates the information stored in the management DB 62, based on the inspection result information. For example, the management control unit 61 stores, in the management DB 62, information on the salt concentration at the inspection point P. The management control unit 61 updates the cumulative emission time of the neutron beam in the non-destructive inspection apparatus 2 used this time and the information on the cumulative exposure dose of the operator A who conducted the inspection, for example. The management control unit 61 generates these pieces of updated information as updated information of the management DB 62.

In step S16, the management control unit 61 transmits the updated information of the management DB 62 to the management apparatus 3 via the management communication unit 60.

In step S17, the apparatus control unit 40 of the non-destructive inspection apparatus 2 receives the result of the determination transmitted from the non-destructive inspection apparatus 2 via the apparatus communication unit 56.

In step S18, the apparatus control unit 40 displays the updated information of the management DB received in step S17 on the display 43 and ends the routine. The updated information of the management DB 62 may be displayed on the mobile terminal M of the operator A as well.

As described above, in the non-destructive inspection system 1 including the non-destructive inspection apparatus 2 of this embodiment, the non-destructive inspection apparatus 2 covers the neutron emission unit 10 and the gamma-ray detector 20, using the apparatus case 30 having the source shutter 13 and the outer shutter 31, and is provided with the dose monitors 51, 52, and 53 inside and outside the apparatus case 30 and inside the source case 12 so as to transmit information on the radioactive doses to the outside via the apparatus communication unit 56. The apparatus control unit 40 opens the source shutter 13 and the outer shutter 31 to allow the emission of the neutron beam from the neutron emission unit 10 only upon acquisition of the inspection permission information from the management apparatus 3.

As described above, the non-destructive inspection apparatus 2 of this embodiment can remotely monitor the exposure doses inside and outside the apparatus from the outside, and execute inspection using neutron beams only when the safety is confirmed. This configuration allows for safe non-destructive inspection of an inspection object, using neutron beams.

In particular, the non-destructive inspection apparatus 2 acquires the position information from the GSNN 55 and transmits the apparatus information including the position information to the outside, thereby making it possible to grasp the position of the non-destructive inspection apparatus 2 easily from the outside and ensure safety more easily.

The non-destructive inspection system 1 including the management apparatus 3 that communicates with the non-destructive inspection apparatus 2 and performs management from the outside transmits inspection permission information to the non-destructive inspection apparatus 2 if predetermined inspection execution requirements according to the apparatus information received by the management control unit 61 from the non-destructive inspection apparatus 2 are satisfied. Since inspection using the non-destructive inspection apparatus 2 is not allowed without permission from the management control unit 61 as described above, it is possible to prevent misuse or abuse of the apparatus by another person.

In particular, since the inspection execution requirements include the inspection position requirement for determining whether the non-destructive inspection apparatus 2 is located at an inspection target point or within an inspection target range, it is possible to prevent inspection at an incorrect location and unnecessary exposure at an unintended location. Since the inspection execution requirements also include the apparatus use requirement for determining whether the radioactive dose attributed to the non-destructive inspection apparatus falls within a predetermined range, it is possible to reduce the exposure of the operator or the surrounding areas.

The management control unit acquires operator information as well. Since the inspection execution requirements also include an operator requirement for determining whether the operator is a person who is allowed to conduct work using the non-destructive inspection apparatus 2, it is possible to ensure the safety of the operator and prevent misuse and abuse by another person.

Since the management control unit 61 can generate route information to the inspection target point or the inspection target range, based on the position information included in the apparatus information and the map information, it is possible to place the non-destructive inspection apparatus 2 at the inspection target point or in the inspection target range with safety and reliability.

The management control unit 61 acquires power supply information on the non-destructive inspection apparatus 2 and generates power-off information for closing the source shutter 13 and the outer shutter 31 and turning off the power supply if the remaining power level in the non-destructive inspection apparatus 2 is lower than or equal to a predetermined amount. It is thus possible to stop the non-destructive inspection apparatus 2 with safety.

Second Embodiment

Next, a second embodiment of the present disclosure will be described.

Figure 4:
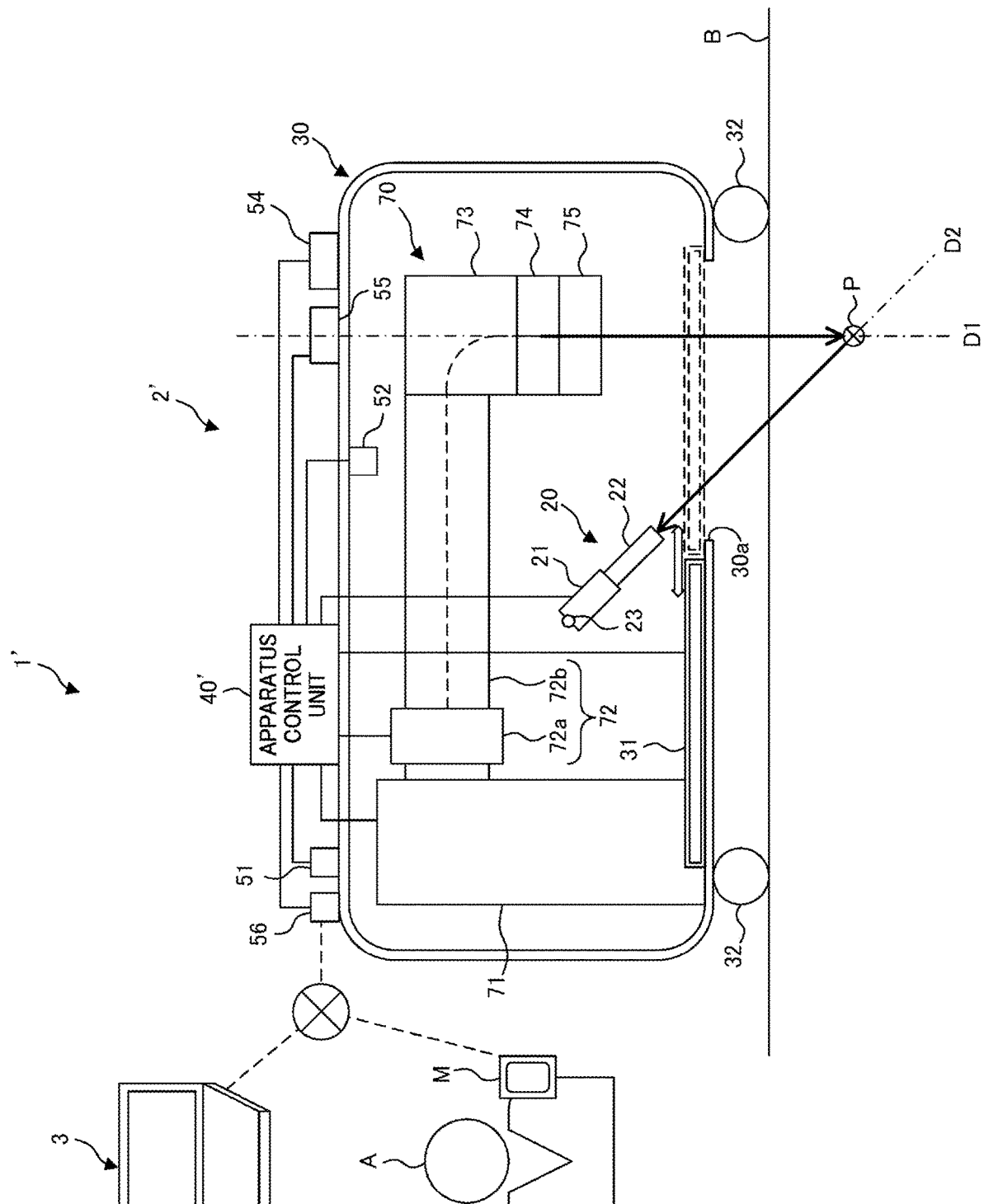
FIG. 4 is a schematic configuration diagram illustrating a non-destructive inspection system including a non-destructive inspection apparatus according to a second embodiment of the present disclosure.
Figure 5:
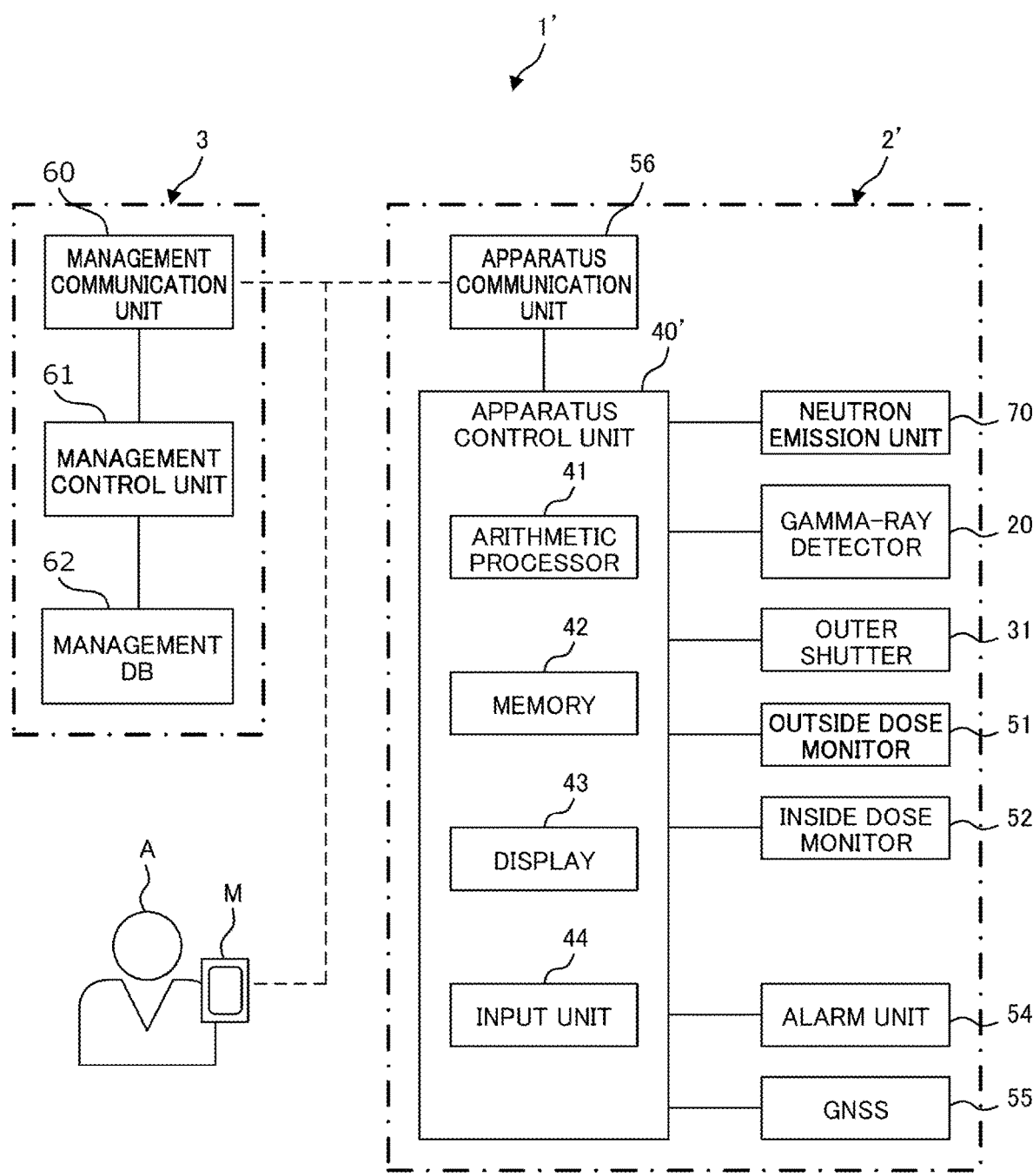
FIG. 5 is a block diagram illustrating a control system of the non-destructive inspection system including the non-destructive inspection apparatus of the second embodiment of the present disclosure.

FIG. 4 is a schematic configuration diagram of a non-destructive inspection system 1' including a non-destructive inspection apparatus 2' of the second embodiment of the present disclosure. FIG. 5 is a block diagram illustrating a control system of the non-destructive inspection system 1' including the non-destructive inspection apparatus 2'. A configuration of the non-destructive inspection system 1' including the non-destructive inspection apparatus 2' of the second embodiment will now be described with reference to these figures. The same reference characters are used to represent the same components as those in the first embodiment, and a description thereof is omitted.

Unlike the neutron emission unit 10 of the first embodiment using the neutron source 11, a neutron emission unit 70 of the second embodiment uses a linear accelerator 72. In addition, the non-destructive inspection apparatus 2' of the second embodiment does not include a source dose monitor.

The neutron emission unit 70 includes a power supply unit 71, the linear accelerator 72 that emits proton beams as charged particle beams, a deflection unit 73, a target section 74, and an emission collimator 75.

Specifically, the power supply unit 71 is a generator that supplies electric power to units. In one preferred embodiment, the generator of the power supply unit 71 has a power generation performance to enable generation of at least protons that are charged particles, causes small voltage fluctuations, and is resistant to harmonic current. The power supply unit 71 may include a battery capable of storing electric power generated by the generator.

The linear accelerator 72 has an ion source 72a that generates protons, and is connected to the deflection unit 73 from the ion source 72a via a cylindrical acceleration unit 72b. The acceleration unit 72b accelerates the protons generated in the ion source 72a and emits the protons, as a proton beam, to the deflection unit 73.

The deflection unit 73 deflects, with magnetic force, the proton beam emitted from the linear accelerator 72 substantially perpendicularly to the direction of incidence of the proton beam, and emits the deflected proton beam toward the target section 74. The deflection unit 73 includes, for example, two magnets facing each other with a magnetic field therebetween. The magnets are electromagnets. Control of the electric current flowing through these electromagnets allows the magnetic field with a predetermined magnetic flux density to be formed between these magnets. The magnets may be permanent magnets as long as an adequate magnetic flux density can be provided.

The target section 74 collides with protons to generate neutron beams, and contains beryllium, for example. Connected to the target section 74 is the emission collimator 75 that selects the neutron beams in a predetermined direction out of the neutron beams generated at the target section 74. The emission collimator 75 is capable of enhancing the directivity of the neutron beams to be emitted. The emission line D1 of the neutron beams extends downward from the apparatus as in the first embodiment. The path from the linear accelerator 72 to the target section 74 has a structure capable of maintaining high vacuum not to prevent the charged particles from flying.

The neutron emission unit 70 with such a configuration is electrically connected to an apparatus control unit 40'. The apparatus control unit 40' is capable of causing the neutron emission unit 70 to emit neutron beams at any time by controlling the time of emitting protons from the ion source 72a.

As shown in FIG. 5, the apparatus control unit 40' of the second embodiment is electrically connected to the gamma-ray detector 20, the outer shutter 31, the outside dose monitor 51, the inside dose monitor 52, the alarm unit 54, the GNSS 55, and the apparatus communication unit 56 in addition to the neutron emission unit 70. The apparatus control unit 40' can execute at least inspection control.

In the inspection control, the apparatus control unit 40' mainly controls the neutron emission unit 70, the outer shutter 31, and the gamma-ray detector 20. Specifically, the apparatus control unit 40' opens the outer shutter 31 at the time of inspection on condition that the inspection permission information is acquired, and allows the neutron emission unit 70 to emit neutron beams. Similarly to the first embodiment, the salt concentration is analyzed based on the gamma dose detected by the gamma-ray detector 20. On the other hand, upon acquisition of the inspection prohibition information, the apparatus control unit 40' closes the outer shutter 31 to prohibit the ion source 72a from emitting protons and causes the alarm unit 54 to issue an alarm.

The apparatus control unit 40' is communicatively connected to the management apparatus 3 via the apparatus communication unit 56. The configuration and function of the management apparatus 3 are the same as those in the first embodiment. The inspection procedure of the non-destructive inspection system 1' in the second embodiment is also the same as in the flowchart of the first embodiment shown in FIG. 3, and the description thereof will thus be omitted.

As described above, in the non-destructive inspection system 1' including the non-destructive inspection apparatus 2' of the second embodiment, the non-destructive inspection apparatus 2' covers the neutron emission unit 50 and the gamma-ray detector 20, using the apparatus case 30, and is provided with the dose monitors 51 and 52 inside and outside the apparatus case 30 so as to transmit information on the radioactive doses to the outside via the apparatus communication unit 56. The apparatus control unit 40' opens the outer shutter 31 to allow the emission of the neutron beam from the neutron emission unit 70 only upon acquisition of the inspection permission information from the management apparatus 3.

As described above, the non-destructive inspection apparatus 2' of the second embodiment can also remotely monitor the exposure doses inside and outside the apparatus from the outside, and execute inspection using neutron beams only when the safety is confirmed. This configuration allows for safe non-destructive inspection of an inspection object, using neutron beams. The non-destructive inspection system 1' of the second embodiment according to other aspects can provide advantages similar to those in the first embodiment.

The embodiments of the present disclosure have been described above. However, aspects of the present disclosure are not limited to the embodiments described above.

While the bridge B has been described as the inspection object in the embodiments described above, the inspection object is not limited thereto. For example, applicable as the inspection object is a road, a wall of a building or a tunnel, a column, or any other concrete structure.

While the emission line of the neutron beams extends downward from the apparatus in the embodiments described above, the emission line of the neutron beams is not limited thereto. For example, if the inspection object is a wall or a column, the neutron beams are emitted horizontally in one preferred embodiment. In such a case, the apparatus case may have an opening in a side surface thereof.

The neutron beams are not necessarily emitted in one direction, but may be emitted in a plurality of directions. For example, the apparatus case may have openings in the bottom surface and a side surface to emit the neutron beams downward and horizontally in a switchable manner in accordance with the inspection object.

While the non-destructive inspection apparatuses of the embodiments described above each include only one gamma-ray detector, the number of the gamma-ray detectors is not limited to one. If containable in the apparatus case, each non-destructive inspection apparatus may include two or more gamma-ray detectors.

While the gamma rays are detected by the gamma-ray detector for analysis of the salt concentration distribution in the embodiments described above, but the radioactive rays to be detected are not limited to the gamma rays. For example, each non-destructive inspection apparatus may detect thermal neutrons, which are generated from an inspection object irradiated with neutron beams, to detect voids and water in the inspection object.

In the embodiments described above, the management control unit 61 generates the inspection prohibition information when the radioactive dose exceeds the predetermined threshold. However, another threshold may be set. For example, in the configuration of the first embodiment described above, since the radioactive dose detected by the source dose monitor 53 correlates with the energy of the neutron beams emitted by the neutron source 11, the management control unit 61 may set a fourth threshold T4, and when the radioactive dose detected by the source dose monitor 53 exceeds the fourth threshold, may transmit inspection prohibition information to the apparatus control unit 40. It is thus possible to prevent a decrease in inspection accuracy due to the energy shortage of the neutron source 11 and unnecessary inspection. It is also possible to inform an operator or other people of the time of replacing the neutron source.

In the above embodiments, dose monitors are provided at various points of the non-destructive inspection apparatus. However, the dose monitors are not limited thereto. For example, an operator may hold a dose monitor and transmit the radioactive dose detected by the dose monitor to the management apparatus, so that the radioactive dose be included in the apparatus use requirement.

DESCRIPTION OF REFERENCE CHARACTERS 1, 1' Non-Destructive Inspection System
2, 2' Non-Destructive Inspection Apparatus
10, 70 Neutron Emission Unit
10a Emission Hole
11 Neutron Source
12 Source Case
13 Source Shutter
20 Gamma-Ray Detector (Radioactive-Ray Detector)
21 Detector
22 Collimator
23 Movable Shaft
30 Apparatus Case
30a Opening
31 Outer Shutter
32 Wheel
40 Apparatus Control Unit
51 Outside Dose Monitor (Dose Detector)
52 Inside Dose Monitor (Dose Detector)
53 Source Dose Monitor (Dose Detector)
54 Alarm Unit
55 Position Information Acquisition Unit (GNSS)
56 Apparatus Communication Unit
60 Management Communication Unit
61 Management Control Unit
62 Management DB
71 Power Supply Unit
72 Linear Accelerator
72a Ion Source
72b Acceleration Unit
73 Deflection Unit
74 Target Section
75 Emission Collimator

The invention claimed is:

1. A non-destructive inspection apparatus that irradiates an inspection object with a neutron beam to analyze an internal structure of the inspection object based on a radioactive ray generated in reaction with the neutron beam, the non-destructive inspection apparatus comprising:
 a neutron emission unit capable of emitting the neutron beam along a predetermined emission line;
 a radioactive-ray detector capable of detecting the radioactive ray incident in a predetermined detection line intersecting the emission line;
 an apparatus case covering the neutron emission unit and the radioactive-ray detector, the apparatus case including an opening on paths of the emission line and the detection line;
 a shutter configured to open and close the opening of the apparatus case;
 a dose detector provided on the apparatus case and configured to detect a radioactive dose;
 an apparatus communication unit capable of transmitting apparatus information including the radioactive dose detected by the dose detector to an outside and capable of receiving inspection permission information from the outside; and
 an apparatus control unit configured to open the shutter to allow emission of the neutron beam from the neutron emission unit upon acquisition of the inspection permission information from the outside via the apparatus communication unit.

2. The non-destructive inspection apparatus of claim 1, further comprising:
 a position information acquisition unit provided on the apparatus case and capable of acquiring position information, wherein
 the apparatus information includes the position information.

3. A non-destructive inspection system comprising:
 the non-destructive inspection apparatus of claim 1;
 a management communication unit capable of receiving the apparatus information from the apparatus communication unit and capable of transmitting the inspection permission information to the apparatus communication unit; and
 a management control unit configured to transmit the inspection permission information to the apparatus communication unit via the management communication unit if a predetermined inspection execution requirement according to the apparatus information is satisfied.

4. The non-destructive inspection system of claim 3, the non-destructive inspection apparatus further comprising:
a position information acquisition unit provided on the apparatus case and capable of acquiring position information, wherein
the apparatus information includes the position information, and
wherein
the inspection execution requirement includes an inspection position requirement for determining whether the non-destructive inspection apparatus is located at an inspection target point or within an inspection target range, based on the position information included in the apparatus information.

5. The non-destructive inspection system of claim 3, wherein
the inspection execution requirement includes an apparatus use requirement for determining whether the radioactive dose attributed to the non-destructive inspection apparatus falls within a predetermined range, based on the radioactive dose included in the apparatus information.

6. The non-destructive inspection system of claim 3, wherein
the management communication unit is capable of acquiring operator information on an operator who conducts work using the non-destructive inspection apparatus, and
the inspection execution requirement includes an operator requirement for determining whether the operator is a person who is allowed to conduct work using the non-destructive inspection apparatus, based on the operator information.

7. The non-destructive inspection system of claim 3, the non-destructive inspection apparatus further comprising:
a position information acquisition unit provided on the apparatus case and capable of acquiring position information, wherein
the apparatus information includes the position information, and
wherein
the management control unit is capable of generating route information to an inspection target point or an inspection target range, based on the position information included in the apparatus information and map information.

8. The non-destructive inspection system of claim 3, wherein
the management control unit acquires power supply information on a power supply of the non-destructive inspection apparatus and generates power-off information for causing the non-destructive inspection apparatus to close the shutter and turn off the power supply if a remaining power level of the non-destructive inspection apparatus is lower than or equal to a predetermined remaining power level.

\* \* \* \* \*